(12) United States Patent
Malak et al.

(10) Patent No.: US 9,650,900 B2
(45) Date of Patent: May 16, 2017

(54) GAS TURBINE ENGINE COMPONENTS WITH FILM COOLING HOLES HAVING CYLINDRICAL TO MULTI-LOBE CONFIGURATIONS

(75) Inventors: Malak Fouad Malak, Tempe, AZ (US); Rajiv Rana, Tempe, AZ (US); Luis Tapia, Maricopa, AZ (US); David Chou, Phoenix, AZ (US); Jong Liu, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 885 days.

(21) Appl. No.: 13/465,647

(22) Filed: May 7, 2012

(65) Prior Publication Data

US 2013/0294889 A1 Nov. 7, 2013

(51) Int. Cl.
*F01D 5/18* (2006.01)

(52) U.S. Cl.
CPC .......... *F01D 5/186* (2013.01); *F05D 2250/14* (2013.01); *F05D 2250/182* (2013.01); *F05D 2260/221* (2013.01); *Y02T 50/676* (2013.01)

(58) Field of Classification Search
CPC ....................................................... F01D 5/186
See application file for complete search history.

(56) References Cited

U.S. PATENT DOCUMENTS

| | | |
|---|---|---|
| 4,461,612 A | 7/1984 | Dodd |
| 4,526,358 A | 7/1985 | Ura et al. |
| 4,529,358 A | 7/1985 | Papell |
| 4,653,983 A | 3/1987 | Vehr |
| 4,664,597 A | 5/1987 | Auxier et al. |
| 4,684,323 A | 8/1987 | Field |
| 4,729,799 A * | 3/1988 | Henricks ................. C30B 33/00 148/404 |
| 4,738,588 A | 4/1988 | Field |
| 5,062,768 A | 11/1991 | Marriage |
| 5,096,379 A | 3/1992 | Stroud et al. |
| 5,261,223 A | 11/1993 | Foltz |
| 5,281,084 A | 1/1994 | Noe et al. |
| 5,382,133 A | 1/1995 | Moore et al. |
| 5,403,156 A | 4/1995 | Arness et al. |
| 5,465,572 A | 11/1995 | Nicoll et al. |
| 5,496,151 A | 3/1996 | Coudray et al. |
| 5,511,937 A | 4/1996 | Papageorgiou |
| 5,609,779 A | 3/1997 | Crow et al. |

(Continued)

FOREIGN PATENT DOCUMENTS

| | | |
|---|---|---|
| EP | 0375175 A1 | 11/1989 |
| EP | 0924384 A2 | 6/1999 |

(Continued)

OTHER PUBLICATIONS

USPTO Office Action, Notification Date; Oct. 3, 2014; U.S. Appl. No. 13/477,883.

(Continued)

*Primary Examiner* — Christopher Verdier
*Assistant Examiner* — Brian O Peters
(74) *Attorney, Agent, or Firm* — Lorenz & Kopf, LLP

(57) ABSTRACT

An engine component includes a body; and a plurality of cooling holes formed in the body, at least one of the cooling holes having a multi-lobed shape with at least a first lobe, a second lobe, and a third lobe.

17 Claims, 8 Drawing Sheets

(56) References Cited

U.S. PATENT DOCUMENTS

| | | |
|---|---|---|
| 5,683,600 A | 11/1997 | Kelley et al. |
| 5,747,769 A | 5/1998 | Rockstroh et al. |
| 6,183,199 B1 | 2/2001 | Beeck et al. |
| 6,243,948 B1 | 6/2001 | Lee et al. |
| 6,329,015 B1 | 12/2001 | Fehrenbach et al. |
| 6,368,060 B1 | 4/2002 | Fehrenbach et al. |
| 6,420,677 B1 | 7/2002 | Emer et al. |
| 6,554,571 B1 | 4/2003 | Lee et al. |
| 6,568,187 B1 | 5/2003 | Jorgensen et al. |
| 6,607,355 B2 | 8/2003 | Cunha et al. |
| 6,616,406 B2 | 9/2003 | Liang |
| 6,979,176 B2 | 12/2005 | Nakamata et al. |
| 6,984,100 B2 | 1/2006 | Bunker et al. |
| 7,052,233 B2 * | 5/2006 | Fried et al. ............ 415/121.2 |
| 7,131,814 B2 | 11/2006 | Nagler et al. |
| 7,186,085 B2 | 3/2007 | Lee |
| 7,186,091 B2 | 3/2007 | Lee et al. |
| 7,246,992 B2 | 7/2007 | Lee |
| 7,249,933 B2 | 7/2007 | Lee et al. |
| 7,273,351 B2 | 9/2007 | Kopmels |
| 7,328,580 B2 | 2/2008 | Lee et al. |
| 7,351,036 B2 | 4/2008 | Liang |
| 7,374,401 B2 | 5/2008 | Lee |
| 7,540,712 B1 | 6/2009 | Liang |
| 7,625,180 B1 | 12/2009 | Liang |
| 7,997,867 B1 | 8/2011 | Shih et al. |
| 7,997,868 B1 | 8/2011 | Liang |
| 8,057,179 B1 | 11/2011 | Liang |
| 8,057,180 B1 | 11/2011 | Liang |
| 8,057,181 B1 | 11/2011 | Liang |
| 8,245,519 B1 | 8/2012 | Liang |
| 8,522,558 B1 | 9/2013 | Xu |
| 8,529,193 B2 | 9/2013 | Venkataramanan et al. |
| 8,572,983 B2 | 11/2013 | Xu |
| 8,584,470 B2 | 11/2013 | Zelesky et al. |
| 8,850,828 B2 | 10/2014 | Mongillo, Jr. et al. |
| 8,857,055 B2 | 10/2014 | Wei et al. |
| 8,961,136 B1 | 2/2015 | Liang |
| 2005/0023249 A1 | 2/2005 | Kildea |
| 2005/0042074 A1 | 2/2005 | Liang |
| 2005/0123401 A1 | 6/2005 | Bunker et al. |
| 2005/0135931 A1 | 6/2005 | Nakamata et al. |
| 2005/0232768 A1 | 10/2005 | Heeg et al. |
| 2005/0286998 A1 | 12/2005 | Lee et al. |
| 2006/0104807 A1 | 5/2006 | Lee |
| 2006/0171807 A1 | 8/2006 | Lee |
| 2006/0272335 A1 | 12/2006 | Schumacher et al. |
| 2006/0277921 A1 | 12/2006 | Patel et al. |
| 2007/0006588 A1 | 1/2007 | Patel et al. |
| 2007/0128029 A1 | 6/2007 | Liang |
| 2007/0234727 A1 | 10/2007 | Patel et al. |
| 2008/0003096 A1 * | 1/2008 | Kohli et al. ............ 415/115 |
| 2008/0005903 A1 | 1/2008 | Trindade et al. |
| 2008/0031738 A1 | 2/2008 | Lee |
| 2008/0271457 A1 | 11/2008 | McMasters et al. |
| 2009/0169394 A1 | 7/2009 | Crow et al. |
| 2009/0246011 A1 | 10/2009 | Itzel |
| 2010/0040459 A1 | 2/2010 | Ohkita |
| 2010/0068032 A1 | 3/2010 | Liang |
| 2010/0124484 A1 | 5/2010 | Tibbott et al. |
| 2010/0303635 A1 | 12/2010 | Townes et al. |
| 2010/0329846 A1 | 12/2010 | Ramachandran et al. |
| 2011/0097188 A1 | 4/2011 | Bunker |
| 2011/0097191 A1 | 4/2011 | Bunker |
| 2011/0123312 A1 | 5/2011 | Venkataramanan et al. |
| 2011/0217181 A1 | 9/2011 | Hada et al. |
| 2011/0268584 A1 | 11/2011 | Mittendorf |
| 2011/0293423 A1 | 12/2011 | Bunker et al. |
| 2011/0311369 A1 | 12/2011 | Ramachandran et al. |
| 2012/0102959 A1 | 5/2012 | Starkweather |
| 2012/0167389 A1 | 7/2012 | Lacy et al. |
| 2013/0045106 A1 | 2/2013 | Lacy |
| 2013/0115103 A1 | 5/2013 | Dutta et al. |
| 2013/0315710 A1 | 11/2013 | Kollati et al. |
| 2014/0208771 A1 | 7/2014 | Koonankeil et al. |
| 2014/0338347 A1 | 11/2014 | Gage et al. |
| 2014/0338351 A1 | 11/2014 | Snyder et al. |
| 2015/0226433 A1 | 8/2015 | Dudebout et al. |
| 2015/0369487 A1 | 12/2015 | Dierberger |

FOREIGN PATENT DOCUMENTS

| | | |
|---|---|---|
| EP | 0992653 A1 | 4/2000 |
| EP | 1609949 A1 | 12/2005 |
| EP | 1892375 A1 | 2/2008 |
| EP | 1942251 A2 | 7/2008 |
| EP | 1970628 A2 | 9/2008 |
| GB | 2409243 B | 11/2006 |
| JP | 07332005 | 12/1995 |
| JP | 2001012204 | 1/2001 |
| JP | 2005090511 | 7/2005 |
| JP | 2006307842 | 11/2006 |
| WO | 2013133913 A1 | 8/2013 |

OTHER PUBLICATIONS

EP Search Report, EP10187079.8-2321 dated Apr. 2, 2011.

Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.

Wayne et al., High-Resolution Film Cooling Effectiveness Comparison of Axial and Compound Angle Holes on the Suction Side of a Turbine Vane, Transactions of the ASME, pp. 202-211, Copyright 2007 by ASME.

Lu et al., Turbine Blade Showerhead Film Cooling: Influence of Hole Angle and Shaping, International Journal of Heat and Fluid Flow 28 (2007) pp. 922-931.

Kim et al., Influence of Shaped Injection Holes on Turbine Blade Leading Edge Film Cooling, International Journal of Heat and Mass Transfer 47 (2004) pp. 245-256.

USPTO Office Action for U.S. Appl. No. 13/477,883 dated Feb. 9, 2015.

EP Search Report for Application 13177511.6 dated Sep. 26, 2014.

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

Loh, Teck Seng; Srigrarom, Sutthiphong; Investigative Study of Heat Transfer and Blades Cooling in the Gas Turbine, Modern Physics Letters B, vol. 19, Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4, 441 (13 pages).

Shih, T. I.-P., Na, S.; Momentum-Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Yiping Lu; Effect of Hole Configurations on Film Cooling From Cylindrical Inclined Holes for the Application to Gas Turbine Blades, A Dissertation, Submitted to the Graduate Faculty of the Louisiana State University and Agricultural and Mechanical College, Dec. 2007.

Colban, W., Thole, K.; Influence of Hole Shape on the Performance of a Turbine Vane Endwall Film-cooling Scheme, International Journal of Heat and Fluid Flow 28 (2007), pp. 341-356.

Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.

Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006, Barcelona, Spain, vol. 3: Heat Transfer, Parts A and B, No. GT2006-90108, pp. 103-116.

Lu, Y., Allison, D., Ekkad, S. V.: Influence of Hole Angle and Shaping on Leading Edge Showerhead Film Cooling, ASME Turbo

(56) References Cited

OTHER PUBLICATIONS

Expo 2006: Power for Land, Sea, and Air (GT2006), May 8-11, 2006, Barcelona, Spain, vol. 3: Heat Transfer, Parts A and B, No. GT2006-90370 pp. 375-382.
Heidmann et al., A Novel Antivortex Turbine Film-Cooling Hole Concept, Journal of Turbomachinery, 2008 by ASME, Jul. 2008, vol. 130, pp. 031020-1-031020-9.
EP Search Report for Application No. EP 13157092.1 Dated Jul. 10, 2015.
EP Examination Report for Application No. EP 13157092.1 Dated Jul. 21, 2015.
Wos, F.J.; Laser Hole-Shaping Improves Combustion Turbine Efficiency; May 1, 2010.
USPTO Office Action, Notification Date Dec. 17, 2015; U.S. Appl. No. 13/477,883.
USPTO Office Action, Notification Date Sep. 10, 2015; U.S. Appl. No. 13/644,824.
EP Communication for EP 13 165 798.3-1610 dated Apr. 24, 2015.
Final Office Action from U.S. Appl. No. 13/477,883 dated Jun. 29, 2016.
USPTO Notice of Allowance for U.S. Appl. No. 13/644,824 dated Feb. 26, 2016.
EP Examination for Application No. 10187079.8-1610 dated Nov. 24, 2016.

\* cited by examiner

GAS TURBINE ENGINE COMPONENTS WITH FILM COOLING HOLES HAVING CYLINDRICAL TO MULTI-LOBE CONFIGURATIONS

STATEMENT REGARDING FEDERALLY SPONSORED RESEARCH OR DEVELOPMENT

This invention was made with support under DTFAWA-10-C-00040 awarded by the U.S. Government. The U.S. Government has certain rights in this invention.

TECHNICAL FIELD

The present invention generally relates to gas turbine engines, and more particularly relates to air cooled components of gas turbine engines, such as turbine and combustor components.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades and stator vanes in order to prevent damage and extend useful life. One mechanism for cooling turbine airfoils is to duct cooling air through internal passages and then vent the cooling air through holes formed in the airfoil. The holes are typically formed uniformly along a line substantially parallel to the leading edge of the airfoil and at selected distances from the leading edge to provide a film of cooling air over the convex side of the airfoil when the cooling air flows therethrough during engine operation. Other rows of cooling holes or an array of holes may be formed in the airfoil components depending upon design constraints. Film cooling attempts to maintain the airfoils at temperatures that are suitable for their material and stress level.

A typical film cooling hole is a cylindrical aperture inclined axially through one of the airfoil sides. In many conventional engines, however, disadvantageous, relatively high cooling air flows have been used to obtain satisfactory temperature control of engine components.

Accordingly, it is desirable to provide a gas turbine engine with improved film cooling. In addition, it is desirable to provide a air-cooled turbine components with improved hole configurations. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine component includes a body; and a plurality of cooling holes formed in the body, at least one of the cooling holes having a multi-lobed shape with at least a first lobe, a second lobe, and a third lobe.

In accordance with another exemplary embodiment, a turbine section of a gas turbine engine includes a housing defining a hot gas flow path; a plurality of circumferential rows of airfoils disposed in the hot gas flow path; a plurality of cooling holes arranged within at least one of the plurality of circumferential rows of airfoils. A first cooling hole of the plurality of cooling holes includes a multi-lobed shape.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved film cooling. The turbine components have a number of cooling holes with tri-lobed shapes. The cooling holes may have, for example, a cylindrical upstream portion that transitions into a downstream portion with the multi-lobed shape.

Figure 1:
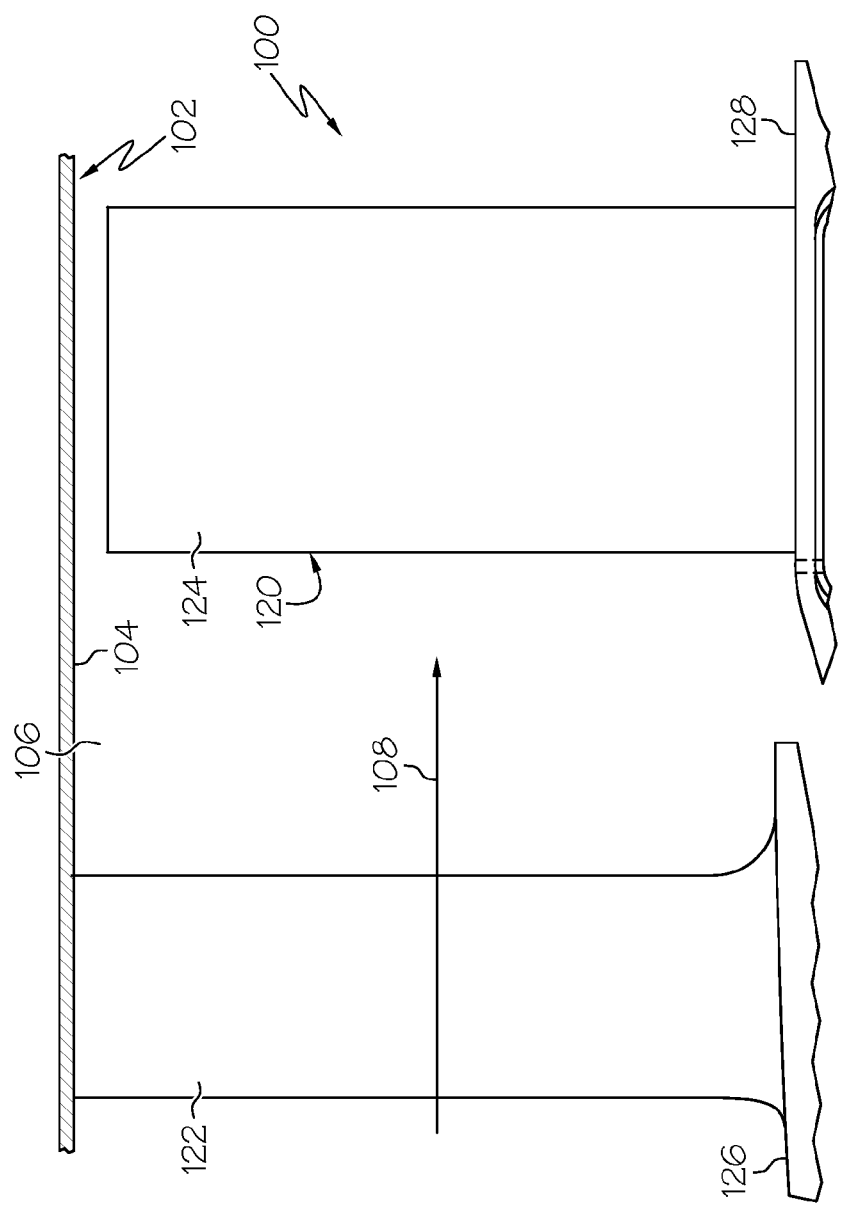
FIG. 1 is a partial, sectional elevation view illustrating a portion of a turbine section of a gas turbine engine in accordance with an exemplary embodiment.

FIG. 1 is a partial sectional elevation view illustrating a portion of a turbine section 100 of a gas turbine engine formed in accordance with an exemplary embodiment. The turbine section 100 and gas turbine engine in general have an overall construction and operation which is understood by persons skilled in the art. In general terms, the turbine section 100 has a housing (or shroud) 102 with an annular (or non-annular) duct wall 104 that defines a mainstream hot gas flow path 106 for receiving mainstream gas flow 108 from an engine combustor (not shown). The mainstream hot gas flow 108 flows past axially spaced circumferential rows of airfoils 120, which include stator vanes 122 and rotor blades 124 formed from suitable materials capable of withstanding the high temperature environment within the mainstream hot gas flow path 106.

The stator vanes 122 project radially outwardly from a circumferential platform 126 to the annular duct wall 104. The rotor blades 124 project radially outwardly from a circumferential platform 128 that is adapted for appropriate connection to the rotor disk (not shown) at the periphery thereof. The rotor disk is generally positioned within the internal engine cavity and is coupled to a main engine shaft for rotation therewith. As shown, the rotor blade 124 and stator vane 122 may form one stage of a multistage turbine. As such, multiple rows of the stator vanes 122 and the rotor blades 124 may be provided in the gas turbine section 100, with the rotor blades 124 and associated rotor disks being rotatably driven by the hot gas flowing through the mainstream hot gas flow path 106 for power extraction. A supply of cooling air, typically obtained as a bleed flow from the compressor (not shown), may pass through cooling holes in the airfoils 122 and 124 to form a surface cooling film. Although the cooling holes are discussed with reference to turbine components, the cooling holes may also be incorporated into other engine components, such as combustor components. The cooling holes are discussed in greater detail below.

Figure 2:
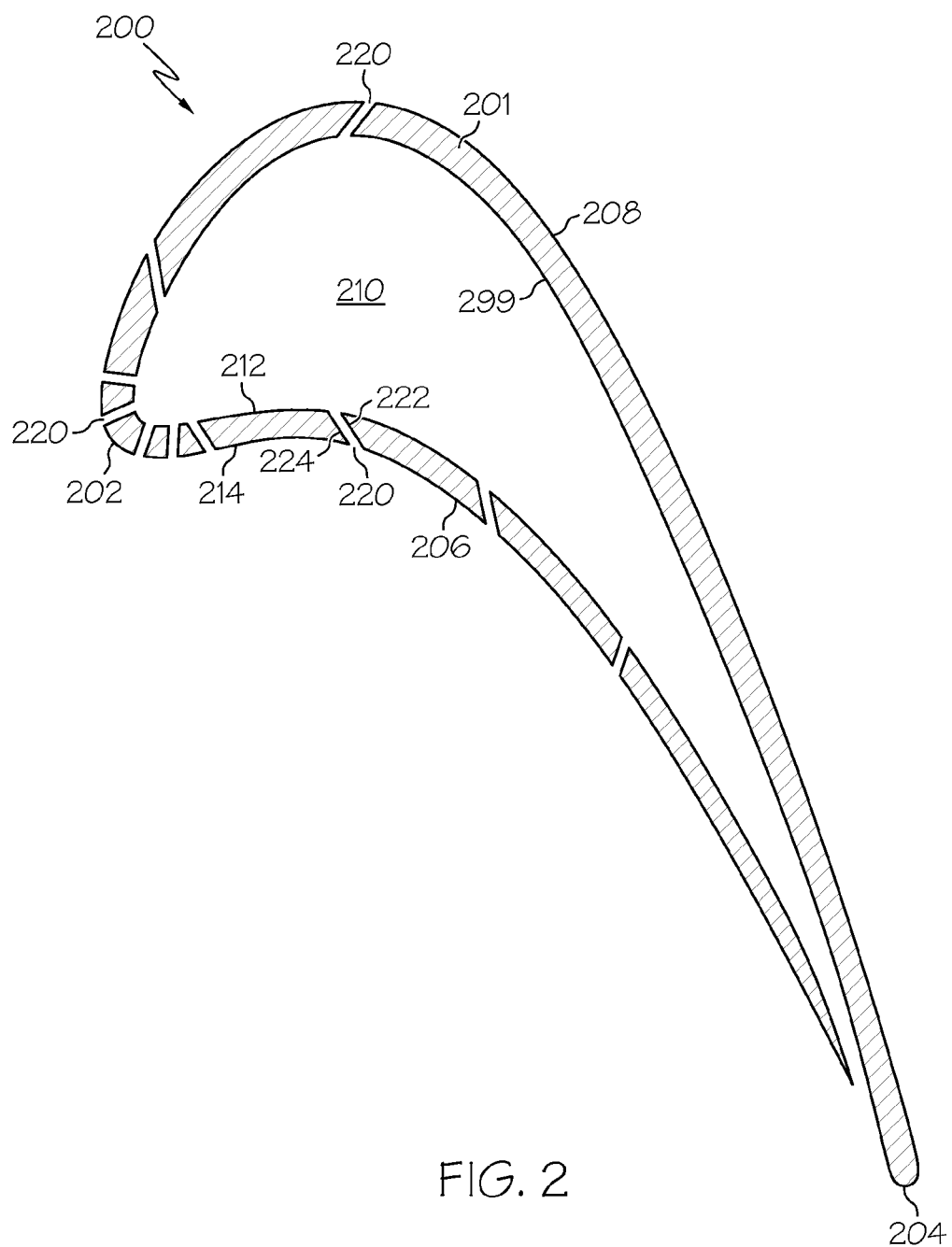
FIG. 2 is a top cross-sectional view of an airfoil that can be incorporated into the turbine section of FIG. 1 in accordance with an exemplary embodiment.

FIG. 2 is a top cross-sectional view of an airfoil 200 that can be incorporated into the turbine section 100 of FIG. 1 in accordance with an exemplary embodiment. In general, the airfoil 200 may correspond to the stator vane 122 or rotor blade 124 of FIG. 1, and the cross-sectional view of FIG. 2 generally corresponds to a horizontal cross-sectional view from the perspective of FIG. 1.

The airfoil 200 generally has a body 201 with a leading edge 202 and an opposite trailing edge 204. The airfoil 200 also includes a pressure sidewall 206 that is generally concave and an opposite, suction sidewall 208 that is generally convex and is spaced-apart from the pressure sidewall 206. The pressure sidewall 206 and suction sidewall 208 extend from leading edge 202 to trailing edge 204. The airfoil 200 has a hollow interior cavity 210 such that the airfoil 200 has an inner surface 212 or 299 and an outer surface 214 or 208. Airfoils 200 used in high performance gas turbine engines, such as those used for aircraft propulsion, can be made from high heat and high stress resistant aerospace alloys, such as nickel based alloys, Rene 88, Inconel 718, single crystal materials, steels, titanium alloys or the like.

As noted above, the airfoil 200 is subject to extremely high temperatures because high velocity hot gases are ducted from the combustor (not shown) onto the airfoil 200. If unaddressed, the extreme heat may affect the useful life of an airfoil. As such, film cooling is provided for the airfoil 200 to provide a cooling film of fluid onto the surface of the airfoil 200, particularly in the area of the leading edge 202 and areas immediately aft of the leading edge 202. As noted above, cooling air is bled from the compressor (not shown) or other source and passes into the interior cavity 210 and through cooling holes 220 to the outer surface 214 or 208 of the airfoil 200. The cooling holes 220 are formed at locations on the airfoil 200, particularly the convex side 206, concave side 208, and leading edge 202, to provide optimum cooling of the engine component.

The cooling holes 220 may be formed in a selected pattern or array to provide optimum cooling. The cooling holes 220 may be disposed at any angle relative to the outer surface 206, such as about 20° to about 40°, although the cooling holes 220 may be oriented at lesser or greater angles. Computational fluid dynamic (CFD) analysis can additionally be used to optimize the location and orientation of the cooling holes 220. The cooling holes 220 may be formed by casting, abrasive water jet, Electron Discharge Machining (EDM), laser drilling, or any suitable process.

In general, the cooling holes 220 may be considered to have an upstream portion 222 adjacent the inner surface 212 or 299 and a downstream portion 224 adjacent to the outer surface 214 or 208. The upstream portion 222 of each cooling hole 220, lying closer to the inner surface 212 or 299 is substantially cylindrical, oval or circular and the downstream portion lying closer to the outer surface 214 or 208 may have shapes as discussed below, particularly at the outer surface 214 or 208. For example, as discussed above, the upstream portion 222 may have a cylindrical (e.g., circular or oval) shape and the downstream portion 224 may have a multi-lobed shape such that the cooling holes 220 may be considered to have a cylindrical to multi-lobe (CTML) configuration.

The performance of the airfoil 200 may be directly related to the ability to provide uniform cooling of its surfaces with a limited amount of cooling air. In particular, the size and shape of each hole 220 determine the distribution of the air flow across the downstream surface. Consequently, the cooling holes 220, particularly their cross-sectional shapes, are important design considerations.

Figure 3:
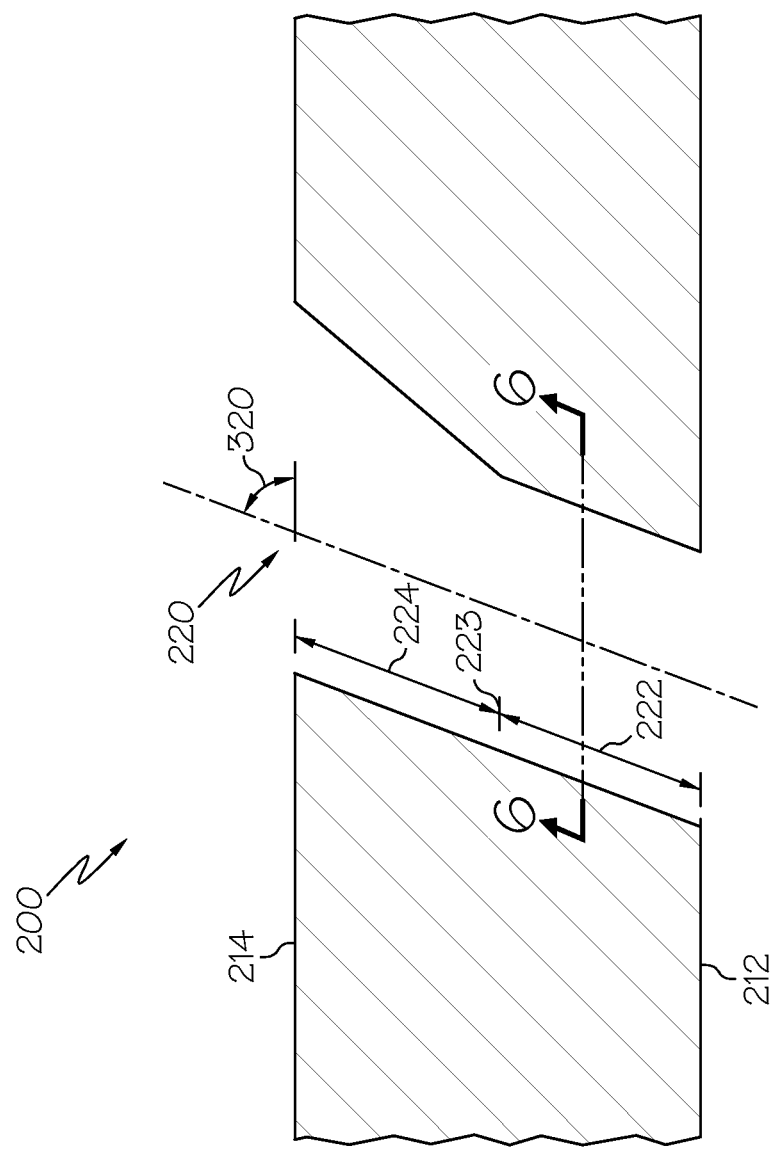
FIG. 3 is a more detailed view of a section of the airfoil of FIG. 2 in accordance with an exemplary embodiment.
Figure 4:
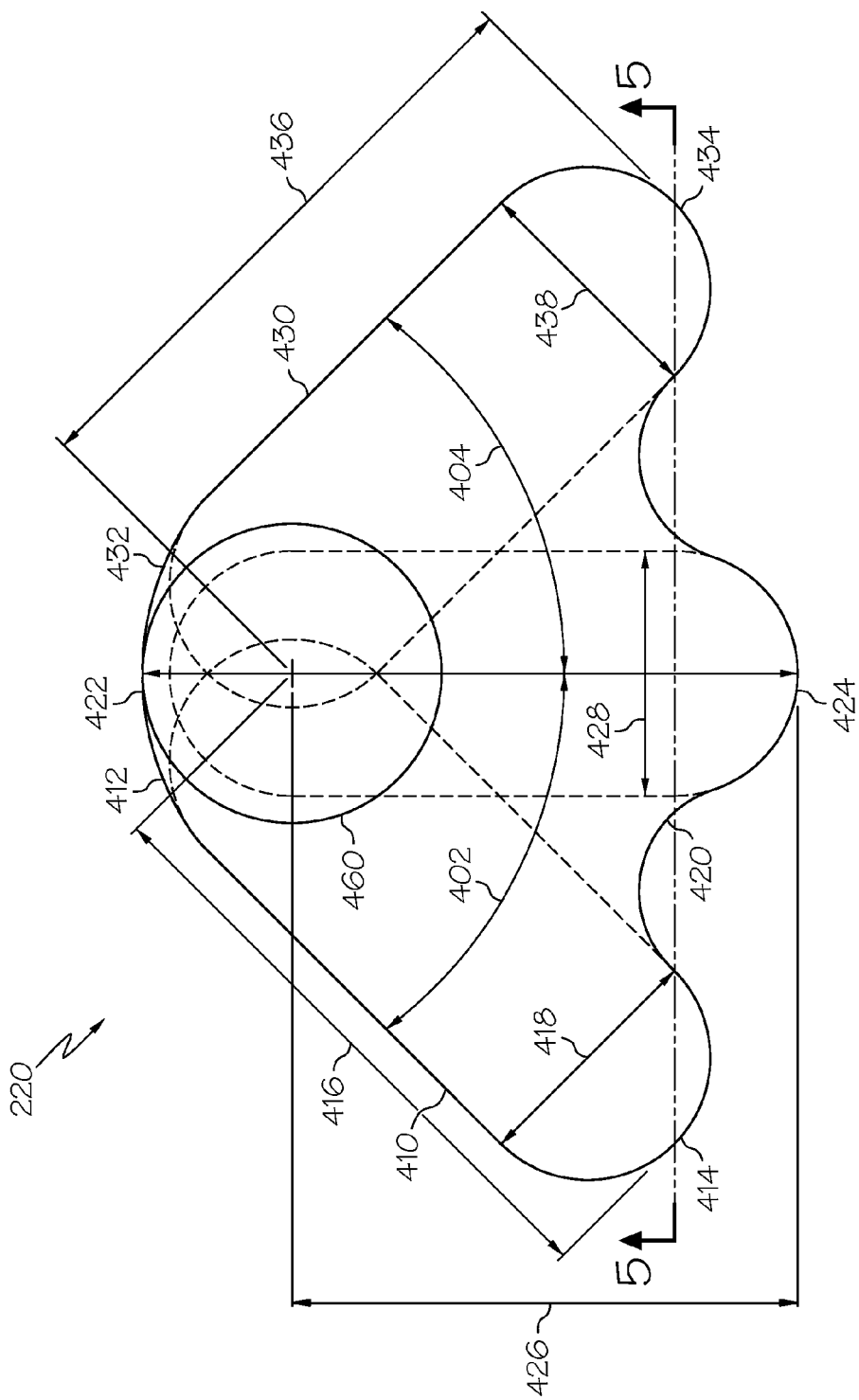
FIG. 4 is a top or outer surface view of the cooling hole of FIG. 3 in accordance with an exemplary embodiment.
Figure 6:
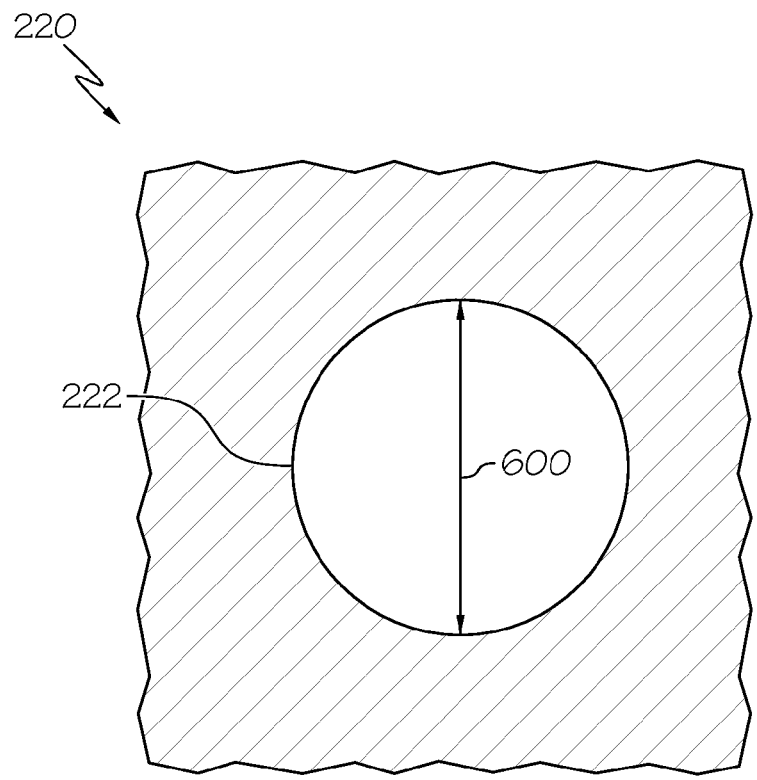
FIG. 6 is a cross-sectional view of the cooling hole through line 6-6 of FIG. 3 in accordance with an exemplary embodiment.
Figure 5:
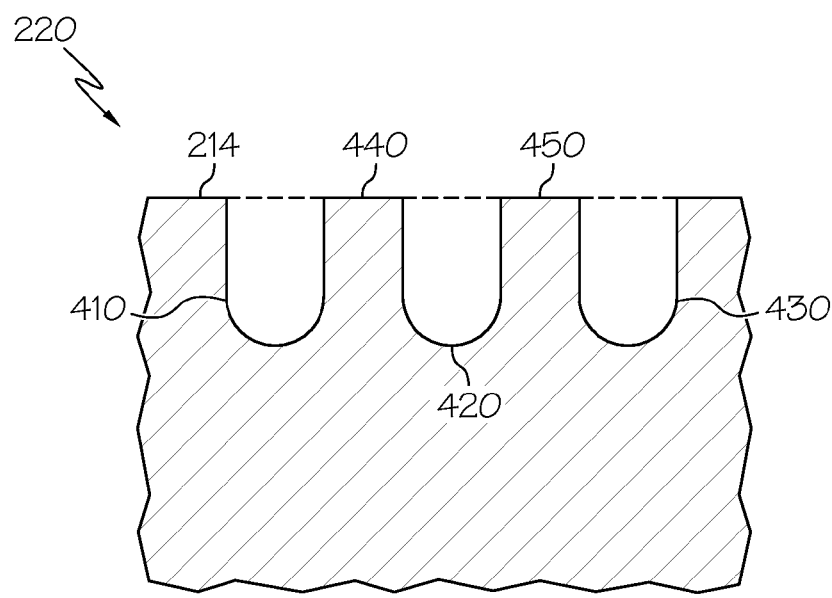
FIG. 5 is a cross-sectional view of the cooling hole through line 5-5 of FIG. 4 in accordance with an exemplary embodiment.

FIG. 3 is a more detailed view of a section of the airfoil 200 of FIG. 2 in accordance with an exemplary embodiment. In particular, FIG. 3 is a cross-sectional view of one of the cooling holes 220. FIGS. 4-6 are additional views of the cooling hole 220 in accordance with an exemplary embodiment. In particular, FIG. 4 is a top or outer surface view of the cooling hole 220 of FIG. 3 in accordance with an exemplary embodiment. FIG. 5 is a cross-sectional view of the cooling hole 220 through line 5-5 of FIG. 4, and FIG. 6 is a cross-sectional view of the cooling hole 220 through line 6-6 of FIG. 3 in accordance with an exemplary embodiment. The cooling hole 220 will now be described in greater detail with reference to FIGS. 3-6.

As noted above and best shown in FIG. 3, the cooling holes 220 may be considered to have an interior or upstream portion 222 adjacent to the inner surface 212 and a downstream portion 224 adjacent to the outer surface 214. Although FIG. 3 and the description below refer to inner surface 212 and outer surface 214, the hole 220 may also be positioned on inner surface 299 and outer surface 208. In some embodiments, a transition portion 223 may be provided between the upstream portion 222 and the downstream portion 224 in which the shape of the hole of the upstream portion 222 gradually transitions into the shape of the downstream portion 224. In other embodiments, such a transition is more abrupt. In general, the portions 222, 223, 224 may be any suitable axial length, e.g., cooling hole 220 may transition between an upstream shape and a downstream shape at any suitable axial location along the length of the hole 220 from the inner surface 212 to the outer surface 214. As described below, cooling hole 220 transitions between the upstream shape (e.g., cylindrical) to the downstream shape (e.g., multi-lobed) at approximately half the axial distance between the inlet of the cooling hole 220 to the exit of the cooling hole 220.

The cooling hole 220 is oriented relative to the inner and outer surfaces 212, 214 at an angle 320. The angle 320 may be, for example, about 35°, although any suitable angle may be selected.

The downstream portion 224 of each cooling hole 220 is at least partially defined by the shape shown in FIG. 4 to provide improved film cooling at the surface 214 of the airfoil 200 for a given air flow. The shape of the cooling hole 220 enables the cooling air to remain attached to the surface 214 for a longer period of time and minimizes mixing of the cooling air and mainstream gas flow, thereby resulting in a more uniform film. Relative to conventional arrangements, the cooling hole 220 reduces the radial velocity (i.e., perpendicular to the surface 214) of the cooling air as it exits the cooling hole 220 to prevent surface separation and provide a smoother transition on the outer surface 214 of the airfoil 200. This results in the cooling flow maintaining attachment to the outer surface 214 in both the streamwise and lateral directions, e.g., by not separating and creating recirculation vortices that draw heated air onto the surface.

As noted above, FIG. 4 is a top or end view of the downstream portion of the cooling hole 220 of FIG. 3 in accordance with an exemplary embodiment. In one exemplary embodiment, the cooling hole 220 is tri-lobed, e.g., the cooling hole 220 is generally formed by a first lobe 410, a second lobe 420, and a third lobe 430 extending from a circular, oval or otherwise cylindrical portion 460. The cylindrical portion 460 generally corresponds to the shape of the upstream portion discussed above, and as discussed in greater detail below. The center of the cylindrical portion 460 generally corresponds to the longitudinal axis of the cooling hole 220.

As shown, each lobe 410, 420, 430 may be oval shaped. In some embodiments, such an oval shape may be considered an ellipsis or a curved rectangle. Each of the lobes 410, 420, 430 has a first end 412, 422, 432 and a second end 414, 424, 434. The first ends 412, 422, 432 are generally coincident, e.g., the foci of each of the first ends 412, 422, 432 are generally aligned, or at least partially overlap with respect to one another. The first and second ends 412, 422, 432; 414, 424, 434 may be any suitable shape, including semi-circular. Moreover, the first and second ends 412, 422, 432; 414, 424, 434 may have the same or different shapes. In one exemplary embodiment, the first and second ends 412, 422, 432; 414, 424, 434 are semi-circular with a radius of curvature of about 0.0065 inches.

The second ends 414, 424, 434 may be considered splayed such that the lobes 410, 420, 430 are angled relative to one another. As such, the tri-lobed shape of the cooling hole 220 may also be considered "W-shaped," "three-prong shaped," or "tri-wing shaped." Generally, the cooling hole 220 may be referred to as "multi-lobed" with three or more lobes. Considering that the upstream portion of the cooling hole 220 is cylindrical and the downstream portion, as shown in FIG. 4 is multi-lobed, the cooling hole 220 may be considered to have a cylindrical to multi-lobe (CTML) configuration.

The cooling hole 220 may be arranged relative to the mainstream gas flow. In one exemplary embodiment, the cooling hole 220 may be arranged such that the second lobe 410 is parallel to the mainstream gas flow, e.g., such that the first ends 412, 422, 432 form a leading edge and the lobes 410, 420, 430 extend in the downstream direction. Other embodiments may have other arrangements.

As noted above, the lobes 410, 420, 430 may generally be oval. In one exemplary embodiment, the lobes 410, 420, 430 may have straight sides and be considered curved rectangles. In other exemplary embodiments, the lobes 410, 420, 430 may have curved sides.

The lobes 410, 420, 430 may have any suitable dimensional, including any suitable length 416, 426, 436 along the respective major axis and any suitable width 418, 428, 438 along the respective minor axis. In one exemplary embodiment, the length 416, 416, 436 (measured from the hole axis) of each lobe 410, 420, 430 may be, for example, about 0.035 inches and the width 418, 428, 438 of each lobe may be, for example, about 0.013 inches, although other dimensions may be provided based on engine size, engine characteristics, and cooling requirements. In one exemplary embodiment, the length 416, 426, 436 of the lobes 410, 420, 430 increase as the cooling hole 220 approaches the exterior surface 214 (or 208) to result in the shape shown in FIG. 4.

Additionally, the lobes 410, 420, 430 may be oriented in any suitable manner relative to one another. In the view of FIG. 4, the first lobe 410 is oriented on one side of the second lobe 420 at a first angle 402, and the third lobe 430 is oriented on the other side of the second lobe 420 at a second angle 404. In one exemplary embodiment, the angles 402, 404 are equal, although in other embodiments, the angles 402, 404 may be different. The angles 402, 404 may be, for example, between about 15° and about 75°, although larger or smaller angles 402, 404 may be provided. In the depicted embodiment, the angles 402, 404 are about 45°, as measured from an outer side to a centerline of the second lobe 420.

The areas between the lobes 410, 420, 430 may be any suitable shape or configuration. As best shown in FIG. 5 and also shown in FIG. 4, in one exemplary embodiment, the areas between the lobes 410, 420, 430 may form lands 440, 450 that extend to the exterior surface 214 of the airfoil 200. FIG. 5 is a cross-sectional view of the cooling hole through line 5-5 of FIG. 3 in accordance with an exemplary embodiment that particularly shows the lands 440, 450 between the lobes 410, 420, 430. Although the lands 440, 450 extend to the exterior surface 214, in other embodiments, the lands 440, 450 may be recessed relative to the exterior surface and curved between the respective lobes 410, 420, 430.

As most clearly shown in FIG. 6, the upstream portion 222 of each cooling hole 220 is substantially circular or oval. As examples, the upstream portion 222 may be circular, as shown, with a diameter 600 of approximately 0.015 inches, or the upstream portion 222 may be oval with a minor diameter of approximately 0.015 inches and a minor diameter of approximately 0.020 inches. The upstream portion 222 may have any suitable cross-sectional diameter(s) 600. In one exemplary embodiment, the diameter of the upstream portion 222 increases as the cooling hole 220 approaches the transition and downstream portions 223, 224. In one exemplary embodiment, the cylindrical upstream portion 222 functions to meter the amount of cooling flow to be used, which the multi-lobed downstream portion 224 functions to defuse and spread that cooling flow over the surface of the turbine airfoil (blade or vane).

As noted above, the lengths 416, 426, 436 and widths 418, 428, 438 of the cooling hole 220 may vary. In the embodiment shown of FIG. 4, the length 426 of the second lobe 420 is approximately equal to the lengths 416, 436 of the first and third lobes 410, 430 such that the second lobe 420 generally extend slightly further in a downstream direction than the other lobes 410, 430. However, in other embodiments, other lengths may be provided, such as shown in FIGS. 7 and 8.

Figure 7:
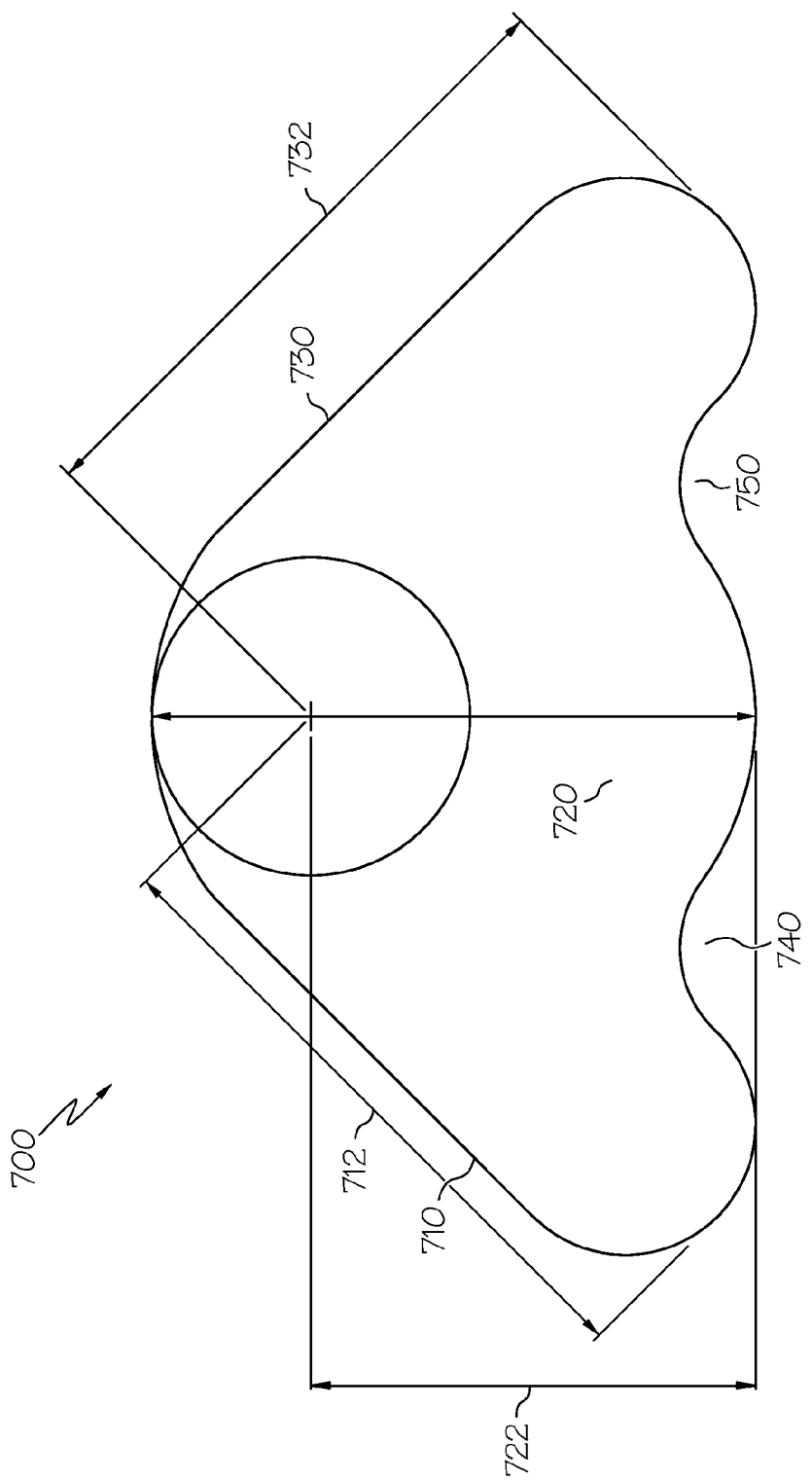
FIG. 7 is an outer surface view of the cooling hole of FIG. 3 in accordance with an alternate exemplary embodiment.
Figure 8:
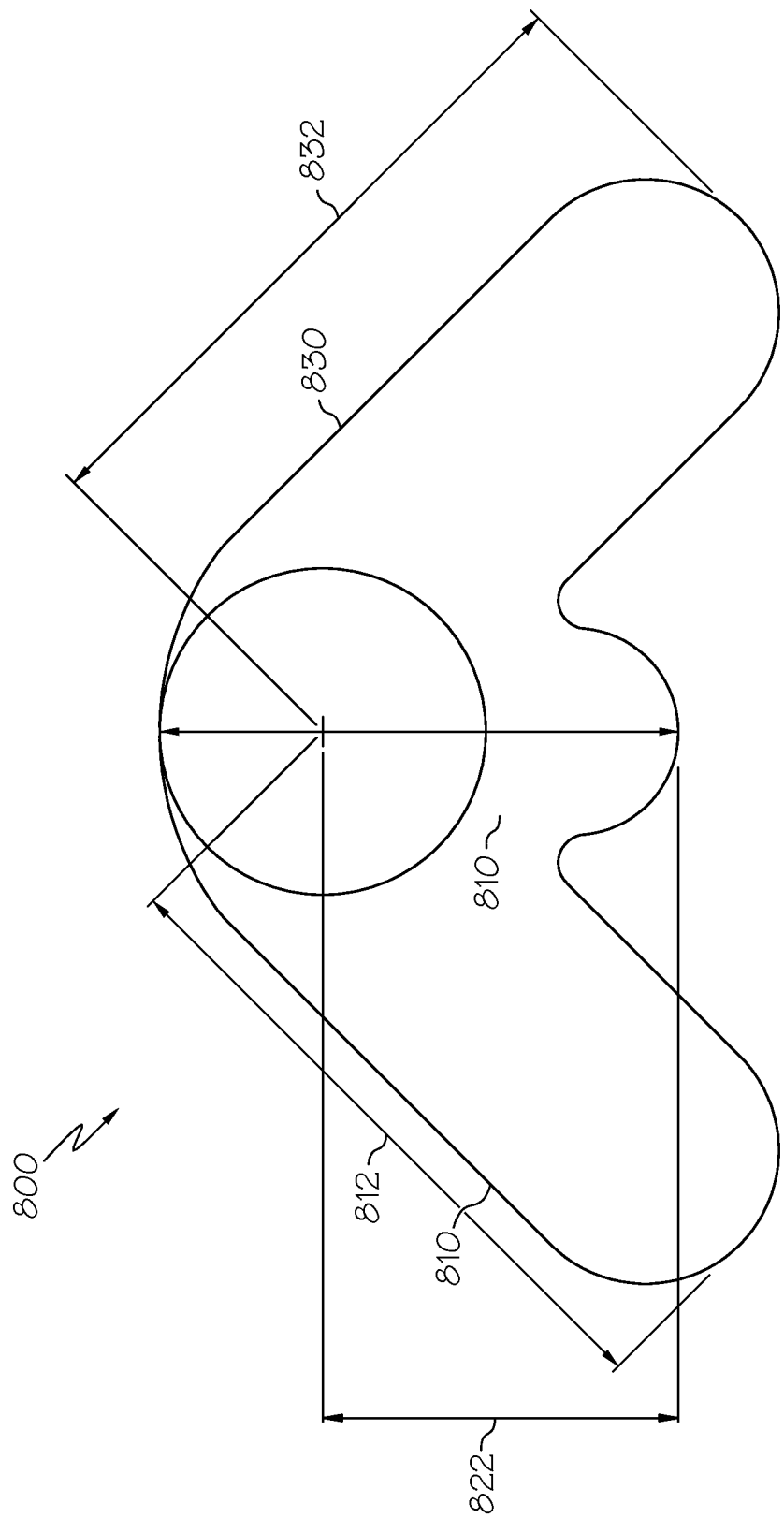
FIG. 8 is an outer surface view of the cooling hole of FIG. 3 in accordance with another alternate exemplary embodiment.

FIGS. 7 and 8 are outer surface views of cooling holes 700, 800 that may be incorporated into the airfoil of FIG. 2 in accordance with an exemplary embodiment. In general, the end views of FIGS. 7 and 8 correspond to FIG. 4. Otherwise, the cooling holes 700, 800 may have cross-sectional views similar to FIGS. 3, 5 and 6.

The cooling hole 700 of FIG. 7 has a tri-lobed shape similar to that of FIG. 4 with a first lobe 710, a second lobe 720, and a third lobe 730. As above, the lobes 710, 720, 730 may have a common end and extend at an angle relative to one another with lands 740, 750 formed in between. In contrast to the cooling hole 220 of FIG. 4, the second lobe 720 has a length 726 slightly shorter than the lengths 716, 736 of the first and third lobes 710, 730 such that the three lobes 710, 720, 730 generally terminate in the same downstream location.

The cooling hole 800 of FIG. 8 has a tri-lobed shape similar to that of FIG. 4 with a first lobe 810, a second lobe 820, and a third lobe 830. As above, the lobes 810, 820, 830 may have a common end and extend at an angle relative to one another with lands 840, 850 formed in between. In contrast to the cooling hole 220 of FIG. 4, the second lobe 820 has a length 826 that is shorter as the lengths 816, 836 of the first and third lobes 810, 830. As such, the second lobe 820 extends a slightly shorter distance than the first and third lobes 810, 830 in the downstream direction. FIGS. 7 and 8 illustrate second lobes 720, 820 with different lengths than that of the second lobe 420 described with respect to FIG. 4. In general, the lengths of any of the lobes discussed above may be varied based on Computational Fluid Dynamics (CFD) analysis. Such variations may also include hole shape and orientation angle of the lobes relative to streamlines of the external flow.

Figure 9:
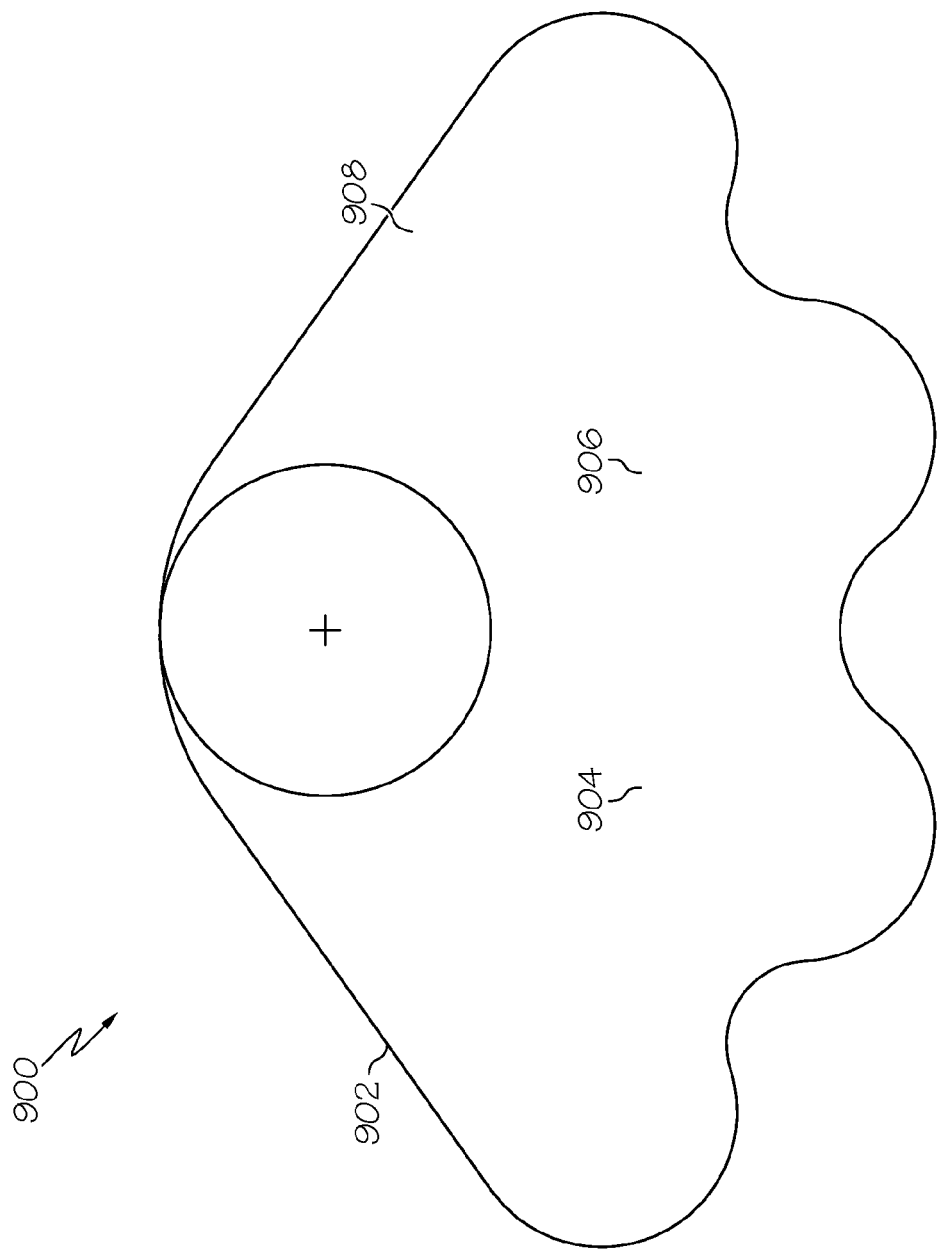
FIG. 9 is an outer surface view of the cooling hole of FIG. 3 in accordance with an alternate exemplary embodiment.

Although tri-lobed cooling holes 220, 700, 800 are described above, exemplary embodiments may be four or more lobes. As an example, FIG. 9 is a top or end view of the downstream portion of the cooling hole 900 similar to those discussed above. However, the cooling hole 900 of FIG. 9 includes a first lobe 902, a second lobe 904, a third lobe 906, and a fourth lobe 908. Additional lobes may be provided.

In general, the holes 220, 700, 800, 900 facilitate the distribution of the cooling air substantially completely over the outer surface of the airfoil. In particular, the cross-sectional shapes function as a diffuser to reduce the velocity and increase static pressure of the cooling airstreams exiting the holes and encourage cooling film development. The holes 220, 700, 800, 900 additionally increase the lateral spread distribution of the exiting airflows, decrease peak velocities, and improve adiabatic effectiveness across a number of blowing ratios. These airstreams are more inclined to cling to the surface for improved cooling rather than separate from the surface. This produces an enhanced cooling effect at the surface. Consequently, exemplary embodiments promote the service life of the airfoil as a result of a more uniform cooling film at the external surfaces.

Exemplary embodiments disclosed herein are generally applicable to air-cooled components, and particularly those that are to be protected from a thermally and chemically hostile environment. Notable examples of such components include the high and low pressure turbine nozzles and blades, shrouds, combustor liners and augmentor hardware of gas turbine engines. Additionally, the cooling holes discussed above may be incorporated into turbine components. The advantages are particularly applicable to gas turbine engine components that employ internal cooling to maintain the service temperature of the component at an acceptable level while operating in a thermally hostile environment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine component, comprising:
a body with an inner surface and an outer surface; and
a plurality of cooling holes formed in the body, the plurality of cooling holes including a first cooling hole, wherein the first cooling hole is defined by a single cylindrical upstream portion with a single inlet on the inner surface that transitions into a multi-lobed shape with at least a first lobe, a second lobe, and a third lobe on the outer surface, wherein the first lobe has a first length on the outer surface, the second lobe has a second length on the outer surface, and the third lobe has a third length on the outer surface, and wherein the first length is different than the second length,
wherein the multi-lobe shape is formed by at least a first oval, a second oval, and a third oval, each oval having a first end and a second end, and wherein the first ends of the at least the first oval, the second oval, and the third oval at least partially overlap,
wherein each of the first, second, and third lobes have straight sides such that at least a portion of each of the first, second, and third lobes have a constant width.

2. The engine component of claim 1, wherein the second ends of the first oval, the second oval, and the third ovals are splayed relative to one another.

3. The engine component of claim 1, wherein the first oval is extends relative to a first side of the second oval at a first angle, and the third oval extends relative to a second side of the second oval at a second angle.

4. The engine component of claim 3, wherein the first angle is equal to the second angle.

5. The engine component of claim 3, wherein the first length and the third length are approximately equal.

6. The engine component of claim 5, wherein the third length is different than the first length and the second length.

7. The engine component of claim 5, wherein the second length is less than the first length.

8. The engine component of claim 1, wherein the multi-lobed shape is arranged in the body relative to mainstream gas flow such that the first ends are upstream and the first, second, and third lobes extend from the from the first ends in a downstream direction.

9. The engine component of claim 8, wherein the multi-lobed shape is further formed by a fourth oval with a first end at least partially overlapping with the first ends of the first, second, and third ovals.

10. The engine component of claim 1, wherein the body is an airfoil body.

11. The engine component of claim 1, wherein the first cooling hole transitions between the single cylindrical upstream portion into the multi-lobed shape approximately half an axial distance between the singe inlet and the outer surface.

12. The engine component of claim 1, wherein the body is formed from a single crystal material.

13. The engine component of claim 1, wherein the body is formed from a nickel based alloy.

14. The engine component of claim 1, wherein areas between the first and second lobes and between the second and third lobes are lands that extend to the exterior surface.

15. A turbine section of a gas turbine engine, comprising:
a housing defining a hot gas flow path;
a plurality of circumferential rows of airfoils disposed in the hot gas flow path, each airfoil defining an inner surface and an outer surface;
a plurality of cooling holes arranged within at least one of the plurality of circumferential rows of airfoils, wherein a first cooling hole of the plurality of cooling holes is defined by a single cylindrical upstream portion with a single inlet on the inner surface that transitions into a multi-lobed shape,
wherein the multi-lobe shape is formed by at least a first oval, a second oval, and a third oval, each oval having a first end and a second end, wherein the first ends of the first oval, the second oval, and the third oval at least partially overlap with one another, and wherein the second ends of the first oval, the second oval, and the third ovals are splayed relative to one another with the second oval being in between the first and third ovals such that the first and second ovals are splayed at a first angle and the second and third ovals are splayed at a second angle, wherein the first and second angles are different from one another,
wherein each of the first, second, and third lobes have straight sides such that at least a portion of each of the first, second, and third lobes have a constant width.

16. The turbine section of claim 15, wherein each of the first oval, the second oval, and the third oval has a different length on the outer surface.

17. An engine component, comprising:
a body with an inner surface and an outer surface; and
a plurality of cooling holes formed in the body, the plurality of cooling holes including a first cooling hole,
wherein the first cooling hole is defined by a single cylindrical upstream portion with a single inlet on the inner surface that transitions into a multi-lobed shape with at least a first lobe, a second lobe, and a third lobe on the outer surface, wherein the first lobe has a first length on the outer surface, the second lobe has a second length on the outer surface, and the third lobe has a third length on the outer surface, and wherein the first length is different than the second length,
wherein the multi-lobe shape is formed by at least a first oval, a second oval, and a third oval, each oval having a first end and a second end, and wherein the first ends of the at least the first oval, the second oval, and the third oval at least partially overlap,
wherein the first, second, and third lobes are each defined by two semicircular ends joined by parallel side portions separated by a respective width, and wherein each of the widths of first, second, and third lobe is different.

* * * * *